J. T. SLOCOMB.
VEHICLE FRAME.
APPLICATION FILED OCT. 30, 1914.
1,186,695.
Patented June 13, 1916.
2 SHEETS—SHEET 1.
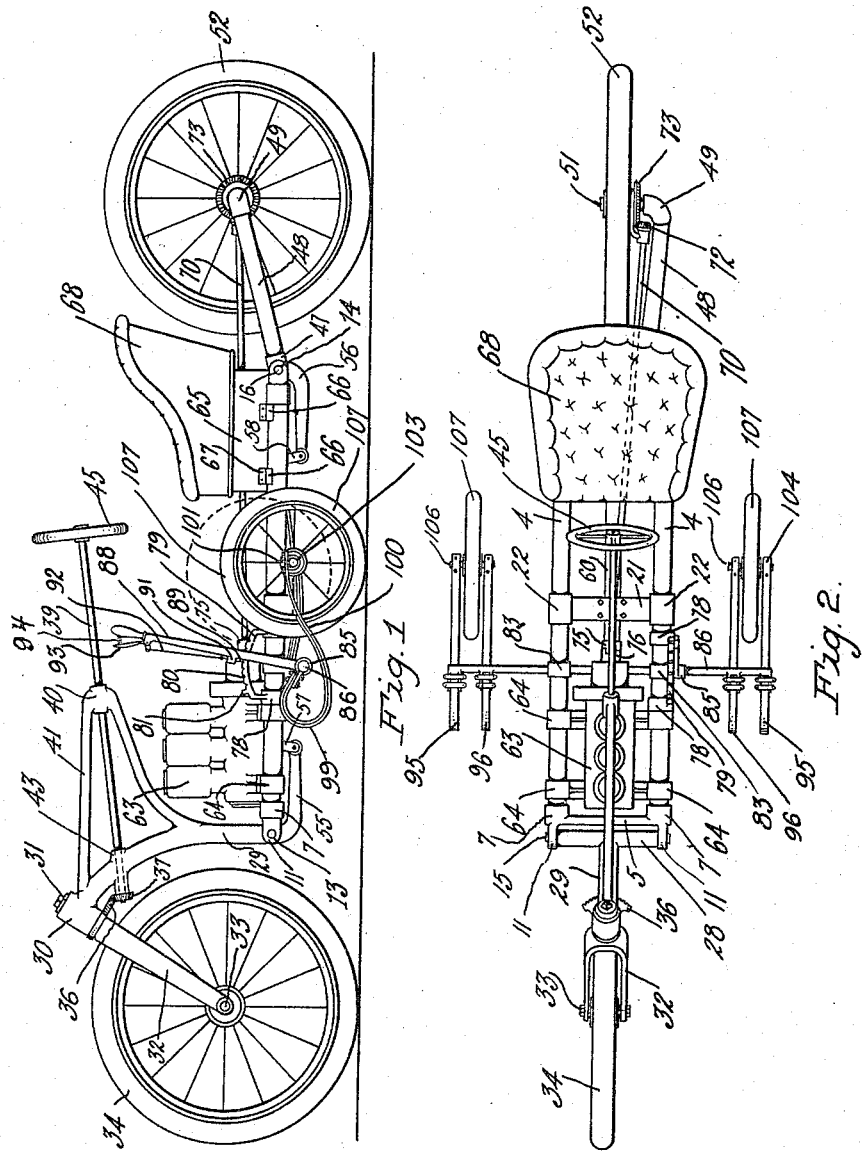
Witnesses.
Albert G. Puczenkowski.
Frieda C. Anderson.
Inventor.
John T. Slocomb
By Horatio E. Bellows
Attorney.

J. T. SLOCOMB.
VEHICLE FRAME.
APPLICATION FILED OCT. 30, 1914.
1,186,695.
Patented June 13, 1916.
2 SHEETS—SHEET 2.
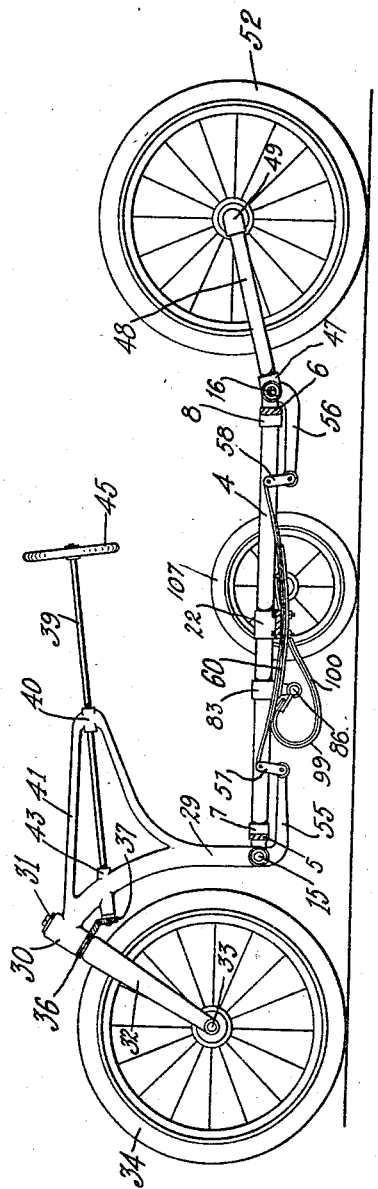
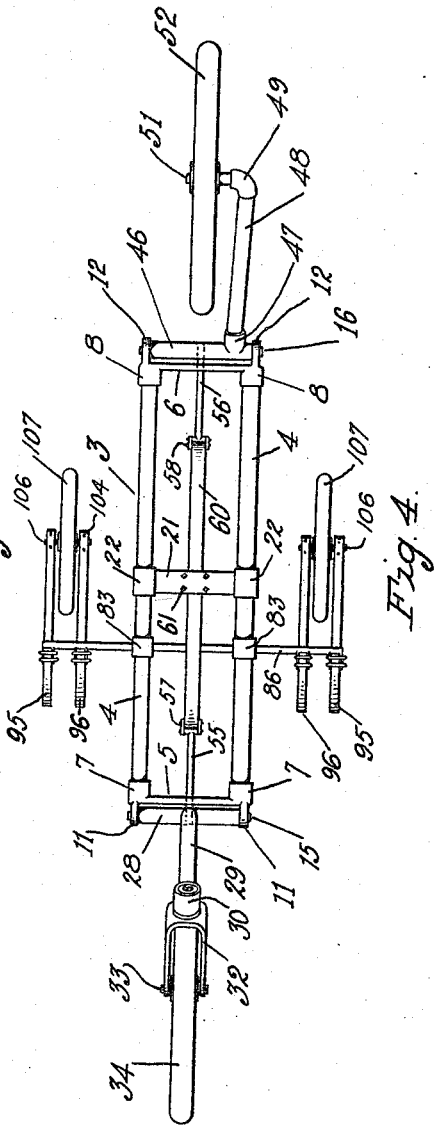
Witnesses
Albert G. Puczenkowski
Freda E. Anderson
Inventor
John T. Slocomb
By Horatio E. Bellows
Attorney

UNITED STATES PATENT OFFICE.

JOHN T. SLOCOMB, OF PROVIDENCE, RHODE ISLAND.

VEHICLE-FRAME.

1,186,695. Specification of Letters Patent. Patented June 13, 1916.

Application filed October 30, 1914. Serial No. 869,406.

*To all whom it may concern:*

Be it known that I, JOHN T. SLOCOMB, a citizen of the United States, residing at Providence, in the county of Providence and State of Rhode Island, have invented certain new and useful Improvements in Vehicle-Frames, of which the following is a specification.

My invention relates to vehicles, and has for its essential objects a successful resistance of torsional effects upon the frame; the adaptation of the frame to safety and increase of speed; the improved distribution of the spring support in conjunction with proper yielding capacity in all parts of the frame; and a provision of lateral supports that shall be adapted to use upon uneven ground and for facile operation; and to attain these ends in a structure which is inexpensive to manufacture and simple to operate.

To the above ends essentially my invention consists in such parts and combinations of parts as fall within the scope of the appended claims.

In the accompanying drawings wherein like reference characters indicate like parts throughout the views, Figures 1 and 2 are side and plan elevations respectively of a motorcycle embodying my invention in its preferred form, and Figs. 3 and 4, a section and plan elevation respectively of the same with the seat, motor, and motor driving connections removed.

The body of my cycle comprises a rectangular frame 3, comprising tubular side rods 4 connected at their ends with cross rods 5 and 6, provided at their ends respectively with short tubes 7 and 8 adapted to embrace the ends of the rods 4 and engaged therewith by threaded connections, brazing, or otherwise. Lugs 11 and 12 upon the ends of the rods 5 and 6 respectively are provided with openings 13 and 14 in which are fast shafts 15 and 16 respectively. A cross bar 21 has end tubes 22 fast upon the side rods. Upon the shaft 15 is loosely mounted a sleeve 28 integral with which, or fixed to which, is an upwardly and forwardly directed curved arm 29 upon whose end is a sleeve 30 in which is journaled a post 31 of the fork 32 on whose axle 33 rotates the front wheel 34. Fixed to the post 31 is a toothed segment 36 engaged by a pinion 37 upon the end of a shaft or rod 39 supported by a sleeve 40 in a rearwardly directed bracket 41 extending from the arm 29. Another portion of the rod 39 is journaled in a bearing 43 located in the arm 29. Upon the outer end of the rod is a steering wheel 45.

Rotatably mounted upon the shaft 16 is a sleeve 46 having a rearwardly directed tubular socket 47 in which is threaded or otherwise fixed a rearwardly directed and preferably upwardly inclined tubular arm 48 fixed in an elbow connection 49 carrying the axle 51 of the rear wheel 52. The socket 47 is at one side the medial point of the sleeve 46 in order to bring the wheel 52 into axial alinement with the front wheel 34. Fixed to the lower faces of the sleeves 28 and 46 respectively are downwardly and inwardly directed arms 55 and 56 respectively, said arms being substantially parallel with the frame and beneath the same and in alinement with each other midway between the side rods 4. Upon the inner ends of the arms 55 and 56 respectively are upwardly directed links 57 and 58 whose upper ends are pivoted to the ends of a leaf or wagon spring 60 whose convex face is downwardly directed at its center, and is, at that point, fixed by bolts 61 or otherwise to the cross bar 21. Upon the described frame is mounted a motor or engine 63 integral with whose base are straps 64 embracing the rods 4. The engine may be mounted on the frame in any convenient manner. A fuel tank 65 has upon its base brackets 66 fixed by rivets 67 or otherwise to the rods 4, and upon the tank is mounted the seat 68. Passing through the tank 65 longitudinally thereof is a power shaft 70 upon whose outer end is a pinion 72 meshing with the gear 73 fast to the wheel 52. A universal joint 75 connects the portion 70 of this shaft to the portion 76 that directly enters the engine casing 63. It will be understood, however, that any usual convenient means for transmitting the power from an engine or motor to the driving wheel may be employed. Upon one of the rods 4 near its forward end are sleeves 78 supporting the ends of a segment 79 provided with notches 80 and a stop shoulder near its forward end 81. Below this segment are fixed to the rods 4 sleeves 83 to whose lower portions are fixed bearings 85 for a rock shaft 86 fast upon which is a hand lever 88. The end 89 of a rod or wire 92 mounted in a lug 91 upon the lever 88 engages the notches of the segment. The upper end of the member 92 engages a hand lever 93 mounted upon the lever 88. A spring 94 between the lever 88 and handle 93 may be employed if desired.

It will be understood that a releasing mechanism of any detailed construction other than that described may be employed with a lever 88 without departing from the spirit of the invention.

Fixed to each end of the shaft 86 are springs 95 and 96 spaced from each other and alike in all respects, so that a detail description of one will suffice for all. The spring 95 extends from its point of union with the shaft slightly upwardly and forwardly and then downwardly and rearwardly forming a forwardly directed loop 99, and thence continues inclined upwardly as at 100, and then horizontally to its rear end as at 101. U-shaped bearings or supports 103 are fixed to the rear ends of the springs by nuts 104 or otherwise, and in these bearings are mounted the axles 106 of wheels 107. These auxiliary wheels are spaced from the sides of the machine frame, and are in contact with the road when the machine is at rest, but may be elevated by the operator manually pressing the lever 93 while he forwardly pushes the lever 88 until the wheels assume any desired height from the ground, as shown in broken lines in Fig. 1; whereupon the pawl 89 is released to engage a notch in the segment.

By virtue of the suspension shown a low center of gravity of the frame is afforded which increases the speed, safety and comfort of the structure. By mounting the rear wheel 52 upon an arm 48 rather than in a fork permits the removal of the wheel, in case of tire trouble, without dismantling the machine. The frame, by virtue of the tubular character of the side rods 4 and its general construction insures stability despite the great torsional strain present in such a machine.

What I claim is:—

1. In a vehicle, the combination with end rods, of sockets on the end rods, tubular side rods fixed in the sockets, lugs on the end rods, shafts mounted in the lugs, sleeves on the shafts, an arm on one sleeve, a fork on the arm, a wheel on the fork, an arm on the second sleeve, an axle on the arm, and a wheel on the axle.

2. In a vehicle, the combination of a frame, lugs on the front of the frame, lugs on the back of the frame, a shaft mounted in each set of lugs, sleeves loose on the shafts, a curved arm on the front sleeve, a fork mounted in the arm, a wheel in the fork, an arm on the rear sleeve, an axle on the arm, a wheel on the axle, inwardly directed arms upon the sleeves, a spring upon the frame, and means for connecting the last named arms with the spring.

3. In a vehicle, the combination of a frame, lugs on the front of the frame, lugs on the back of the frame, a shaft mounted in each set of lugs, sleeves loose on the shafts, a curved arm on the front sleeve, a fork mounted in the arm, a wheel in the fork, an arm on the rear sleeve, an axle on the arm, a wheel on the axle, inwardly directed arms upon the sleeves, a carriage spring fixed at its center to the frame with its convex central portion downwardly directed, and members connecting the ends of the spring to the ends of the last mentioned arms.

4. In a motorcycle, the combination of a frame, lugs upon the front of the frame, lugs on the back of the frame, a seat mounted upon the rear portion of the frame, a shaft mounted in each set of lugs, sleeves loose on the shafts, a curved arm on the front sleeve, a fork rotatably mounted in the end of the arm, a wheel in the fork, a toothed segment on the fork, a horizontally disposed rearwardly directed bracket upon the curved arm, a shaft rotatably mounted in the bracket and arm, a pinion on the shaft engaging the segment, a wheel on the shaft, an arm on the second sleeve, an axle on the last mentioned arm, and a wheel on the axle.

In testimony whereof I have affixed my signature in presence of two witnesses.

JOHN T. SLOCOMB.

Witnesses:
WASHINGTON R. PRESCOTT,
FREDA C. ANDERSON.